Figure 1:
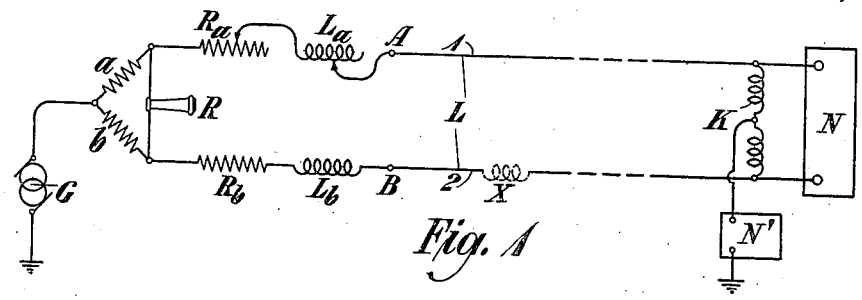

R. G. McCURDY.
TESTING APPARATUS.
APPLICATION FILED AUG. 19, 1920.

1,421,702.

Patented July 4, 1922.

INVENTOR
R.G. McCurdy
BY
ATTORNEY

UNITED STATES PATENT OFFICE.

RALPH G. McCURDY, OF CRESSKILL, NEW JERSEY, ASSIGNOR TO AMERICAN TELEPHONE AND TELEGRAPH COMPANY, A CORPORATION OF NEW YORK.

TESTING APPARATUS.

1,421,702.  Specification of Letters Patent.  Patented July 4, 1922.

Application filed August 19, 1920. Serial No. 404,583.

*To all whom it may concern:*

Be it known that I, RALPH G. McCURDY, residing at Cresskill, in the county of Bergen and State of New Jersey, have invented certain Improvements in Testing Apparatus, of which the following is a specification.

This invention relates to testing apparatus. It is concerned particularly with methods of and means for locating unbalances in transmission lines and is described herein with particular reference to telephone lines, but it is understood that it is applicable also to transmission circuits of different nature.

The type of unbalance with which the present invention is concerned is that which consists in an unsymmetrical condition of the conductors of a transmission circuit with respect to adjacent wires or to ground. Such an unbalance manifests itself at certain frequencies of current as a difference in the impedance of the one side relatively to the other; and it may be due to any one or more of certain well-known causes, the most common among which are high resistance joints, transposition irregularities, defective loading coils and broken insulators. When such unbalance exists, the circuit is susceptible to interference from adjacent power, telegraph or telephone lines, causing noise or cross-talk in the telephone apparatus. The present invention is primarily concerned with the location of such unbalance or unbalances in a transmission line, so that a repair man may be sent to within a close proximity of the irregularity and the cause thereof removed.

The invention is founded on the well-known principle that an impedance irregularity in a transmission line causes the reflection of part of the current wave to the sending station. The phase which the reflected current has when it reaches the station depends upon the length of the current wave and the distance of the irregularity from the station. Since the wave length depends upon the frequency of the current, it is obvious that when the frequency of the sending source is varied throughout a wide range, the reflected current differs in phase from the source periodically from zero degrees to 360 degrees, so that at certain frequencies it augments the current from the source and at other frequencies, decreases the same. A graph of the two currents combined, plotted against frequency, will therefore have a wavy shape, a crest recurring periodically at such frequencies, at which the outgoing and the reflected current are additive and a trough at such frequencies, at which they are in opposition. The difference in frequency between the successive waves of the graph, as, for example, the distance between successive crests, is a measure of the distance between the irregularity or unbalance and the source; and by mathematical proof, it may be shown that $$S = \frac{V}{2\triangle f}$$

wherein S is equal to the distance of the irregularity from the source, V is equal to the velocity of propagation of current waves over the line, and $\triangle f$ is equal to the frequency increment between successive waves of the graph.

It is proposed in the present invention to create, by means of an unbalanced impedance associated with the line at the testing station, an artificial irregularity which is of such nature that it sets up a current which is the same in amplitude and opposite in phase to the reflected current entering the testing station, thus neutralizing the same in its effect on the outgoing current. The frequency of the current source is varied in convenient steps throughout a wide range and the value of the said neutralizing unbalanced-impedance is determined for each frequency step. The said impedance is then plotted against frequency and the distance of the irregularity is calculated, by means of the formula hereinbefore given, from the frequency increment between successive waves of the resulting graph.

Figure 2:
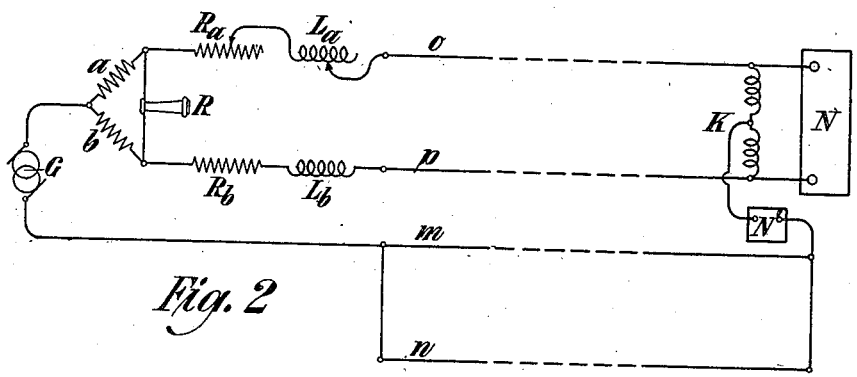
Figure 3:
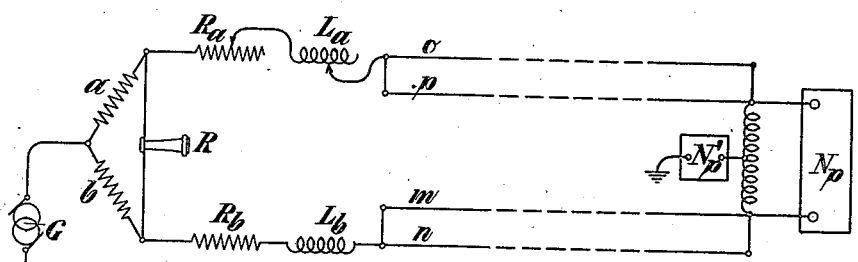

A good understanding of the invention may now be had from the following description of certain specific forms of embodiment thereof, shown in diagrammatic view in the accompanying drawing, in which Figure 1 shows one form of embodiment of the invention; Figs. 2 and 3, modification of Fig. 1; and Fig. 4, a graph of the character mentioned above.

In Fig. 1 reference character L designates a transmission line composed of conductors 1 and 2, which line is to be tested for an unbalance. An inductance coil K is bridged across the line at the distant end. A network N is connected across the line adjacent to the coil and a network N' is connected between the midpoint of coil K and ground. These networks consist of arrangements of impedance devices so related to the line, that the same, as viewed from the terminals A and B, have substantially infinite length both in respect to the relations between the two wires of the circuit and to their relations to ground. Reflection effects are thus avoided at the far end of the line. At the testing station, the line is associated with an A. C. bridge which comprises resistance $R_a$ and inductance $L_a$, connected in series with conductor 1 of the line and resistance $R_b$ and inductance $L_b$, connected in series with conductor 2. Ratio arms consisting of resistances $a$ and $b$ are associated with the terminals of $R_a$ and $R_b$, and a source of current consisting of the generator G of variable frequency is connected between ground and the junction point of $a$ and $b$.

The current from G flows through the arms of the bridge, line conductors 1 and 2 in parallel with each other, the winding of the coil K in opposite directions, and the network N' to ground return. The ratio arms $a$ and $b$ have equal resistance and the devices $R_a$ and $L_a$ are, in their normal adjustment, equal to $R_b$ and $L_b$ respectively. If, therefore, conductors 1 and 2 are in balance, the current divides equally between them, so that the terminals of receiver R connected between the apexes of the bridge are at equal potential. The receiver is therefore silent and indicates that the line is in balance.

However, if an unbalance does exist, as indicated by the inductance shown in dotted lines at the point $x$, there will be reflection of a certain part of the current, which current circulates in the path comprised of conductors 1 and 2 in series with each other, the bridge at the measuring station and the network N at the distant terminal of the line. Receiver R will, therefore, generate a sound, thus giving notice that an unbalance exists on the line. The testman adjusts resistance $R_a$ and the inductance $L_a$ until the receiver is silent. He thus creates in the one arm of the bridge an impedance which is not balanced in the other arm but which is of such nature as to neutralize the effect of the inductance at $x$, as explained hereinbefore. He notes the value of the change (+ or —) in $R_a$, or $L_a$, and repeats the measurement after changing the frequency of source G, say, 20 cycles.

Figure 4:
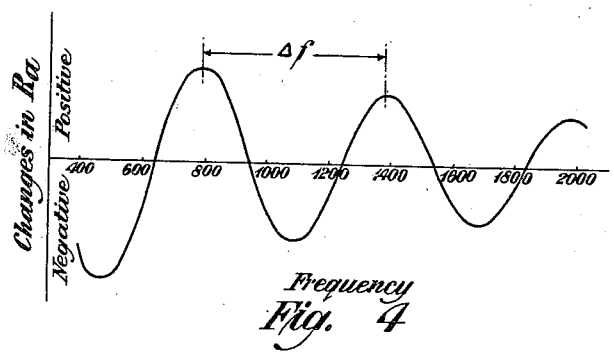

The test is continued until a wide range of frequencies is covered, for example, from 400 to 2000 cycles. A curve is then plotted, such as illustrated in Fig. 4, in which the abscissæ are values of frequency and the ordinates changes in $R_a$, an increase of resistance being plotted above the axis and a decrease below. The frequency increment between successive waves as, for example, between crests, is then ascertained and substituted in the formula hereinbefore referred to, together with the velocity of propagation of the circuit, so that S may be calculated. In the present case $\Delta f$ is found to be 600 cycles per second, V is equal to 168,000 miles per second hence S is equal to 140 miles.

It is, of course, understood that a plot of the variation in $L_a$ may be used in the same manner, but in the ordinary case it is sufficient to read the changes in only one of the devices, $R_a$ or $L_a$.

A modification of the invention, shown in Fig. 2, is particularly applicable to the circuits of phantom groups of conductors. In this figure, the phantom group is shown as composed of conductors $m, n, o, p$, of which $mn$ constitute one side circuit of the group, $op$ another side circuit of the group and $mn$ in parallel, together with $op$ in parallel, compose the phantom circuit thereof. For making an unbalance test on the side circuit $op$, the apparatus is connected as shown in the drawing. It will be observed that this is similar in all respects to the arrangement described in Fig. 1, except that the flow of return current of source G is effected through conductors $mn$ in parallel with each other, instead of through ground. In this manner the test serves to locate unbalance, such as transposition irregularities between the circuit $op$ and the phantom circuit of the group, which irregularities would be difficult to detect by the grounded return arrangement. The side circuit $mn$ may be tested by connecting the bridge to conductors $mn$ and causing the return flow of current through conductors $op$ in parallel, as will be readily understood.

The phantom circuit of the group may be tested by the arrangement shown in Fig. 3, the conductors $mn$ in parallel being associated with the one side of the bridge and the conductors $op$ in parallel, with the other side of the bridge, and the return flow of current being brought about through the ground. The networks $N_p$ and $N'_p$ are provided for purposes similar to those for which the networks N and N' of Fig. 1 are provided.

Although I have shown and described herein only a few forms of embodiment of my invention and methods of practicing the same, it is readily understood that many changes and modifications may be made therein within the scope of the following claims, without departing from the spirit and scope of the invention.

What is claimed is:

1. The method of testing a transmission circuit for an unbalance of the nature described, which consists in causing alternating current to traverse the sides of the circuit in parallel with each other, varying the frequency of the current in steps throughout a wide range and ascertaining for each step the difference between the impedance of the one side of the circuit and that of the other.

2. The method of testing a transmission circuit for an unbalance of the nature described, which consists in building out one end of the line to an apparently infinite length, causing current to flow from the other end of the circuit over the sides thereof in parallel with each other to the said built-out end, and ascertaining for each step the difference between the impedance of the one side of the circuit and that of the other.

3. The method of determining the distance of an unbalance in a transmission circuit from a testing station, which consists in testing the circuit for an unbalancing impedance irregularity and calculating the distance of said irregularity from the testing station.

4. The method of testing a transmission line for an unbalance of the nature described, which consists in so applying current to the line that part thereof is reflected by the unbalancing irregularity, and ascertaining the change in said current with frequency.

5. The method of testing a transmission line for an unbalance of the nature described, which consists in so applying current to the line that part thereof is reflected by the unbalancing irregularity, creating at the testing station a current to neutralize the effect thereat of the reflected current, and ascertaining the change in said neutralizing current with frequency.

6. The method of testing a transmission circuit for an unbalance, which consists in associating the sides of said circuit, in parallel with each other, with a source of alternating current, varying the frequency of said current in steps throughout a wide range and changing at each frequency step the impedance of the one side of the circuit relatively to the other until the current in the one side is equal to that in the other in both amplitude and phase, and determining for each frequency step the said change in impedance of the one side relatively to the other.

7. The method of testing the side circuit of a phantom group of conductors for unbalances of the character described, which consists in causing alternating current to flow through the conductors of the said side circuit in parallel with each other in one direction, and return through the conductors of the other side circuit in parallel with each other, varying the frequency of the current in steps throughout a wide range and ascertaining for each step the difference in the impedance of the one conductor of the circuit relatively to the other.

8. In an apparatus for testing a transmission circuit for unbalance of the nature described, a source of current of variable frequency, means for causing flow of current from said source through the sides of said circuit in parallel with each other, and means adjacent one end of the circuit for changing the impedance of the one side relatively to that of the other until the current therein is equal in amplitude and phase to that of the other.

9. In an apparatus for testing a transmission circuit for an unbalance of the character described, a source of current of variable frequency, means for causing current from said source to flow through the sides of said circuit in parallel with each other, means for equalizing the flow of current in the two sides of the circuit and means for indicating the change of impedance of either side necessary to bring about said equalization.

10. In an apparatus for testing a transmission circuit for an unbalance of the character described, a Wheatstone bridge having substantially equal ratio arms, resistance and reactance elements in the measuring arms of the bridge, the one side of the transmission circuit under test being connected in series with the one measuring arm and the other side of the said circuit in series with the other measuring arm, a network at the other end of the said circuit for artificially extending the same to substantially infinite length, an electrical connection between the said other end of said circuit and the junction point of the said ratio arms, another connection between the apexes of said bridge, a source of current of variable frequency in one of said connections and a translating device in the other, for indicating when said bridge is in balance.

In testimony whereof, I have signed my name to this specification this 17th day of August, 1920.

RALPH G. McCURDY.